(12) United States Patent
Grabelsky et al.

(10) Patent No.: US 7,450,560 B1
(45) Date of Patent: *Nov. 11, 2008

(54) METHOD FOR ADDRESS MAPPING IN A NETWORK ACCESS SYSTEM AND A NETWORK ACCESS DEVICE FOR USE THEREWITH

(75) Inventors: David A. Grabelsky, Skokie, IL (US);
Michael S. Borella, Naperville, IL (US);
John Poplett, River Forest, IL (US);
Richard J. Dynarski, Freehold, NJ (US)

(73) Assignee: 3Com Corporation, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,516

(22) Filed: May 31, 2000

Related U.S. Application Data

(63) Continuation-in-part of application No. 09/035,600, filed on Mar. 5, 1998, now Pat. No. 6,353,614.

(51) Int. Cl.
*H04L 12/66* (2006.01)

(52) U.S. Cl. .............. 370/352; 370/389; 370/395.52; 370/395.54; 709/227

(58) Field of Classification Search ............... 370/252, 370/352, 392, 389, 396, 397, 398, 399, 395.2, 370/395.52, 395.54, 401, 402, 474, 475
See application file for complete search history.

(56) References Cited

U.S. PATENT DOCUMENTS

| | | | |
|---|---|---|---|
| 4,953,198 A | 8/1990 | Daly et al. ................ 379/61 |
| 5,159,592 A | 10/1992 | Perkins ................... 370/85.7 |
| 5,227,778 A | 7/1993 | Vacon et al. ........... 340/825.52 |
| 5,327,365 A | 7/1994 | Fujisaki et al. ............. 364/717 |
| 5,442,633 A * | 8/1995 | Perkins et al. ............. 370/331 |
| 5,497,339 A | 3/1996 | Bernard .................... 364/705.5 |
| 5,526,353 A | 6/1996 | Henley et al. ............. 370/60.1 |
| 5,526,489 A | 6/1996 | Nilakantan et al. ...... 395/200.02 |
| 5,550,984 A | 8/1996 | Gelb ...................... 395/200.17 |
| 5,604,737 A | 2/1997 | Iwami et al. ............... 370/352 |
| 5,606,594 A | 2/1997 | Register et al. ............... 379/58 |

(Continued)

FOREIGN PATENT DOCUMENTS

WO    WO 01/31888 A1    5/2001

OTHER PUBLICATIONS

G. Montene, Internet Engineering Task Force, Internet Draft, "Negotiated Address Reuse" (NAR), <draft-montenegro-aatn-nar-00.txt>, May 1998, pp. 1 to 22.

(Continued)

*Primary Examiner*—Chi Pham
*Assistant Examiner*—Shick Hom
(74) *Attorney, Agent, or Firm*—McDonnell Boehnen Hulbert & Berghoff LLP

(57) ABSTRACT

A method to support the assignment of a globally unique network public address and, optionally, a number of locally unique ports to a first private network subdevice having a private network address on a network access system from a second private network subdevice having a public network address using Realm Specific Internet Protocol, wherein the public network address is used by the first private network device to communicate with network devices on an external network.

21 Claims, 12 Drawing Sheets

U.S. PATENT DOCUMENTS

| | | | |
|---|---|---|---|
| 5,636,216 A | 6/1997 | Fox et al. | 370/402 |
| 5,654,957 A | 8/1997 | Koyama | 370/355 |
| 5,708,655 A | 1/1998 | Toth et al. | 370/313 |
| 5,737,333 A | 4/1998 | Civanlar et al. | 370/352 |
| 5,742,596 A | 4/1998 | Baratz et al. | 370/356 |
| 5,754,547 A | 5/1998 | Nakazawa | 370/401 |
| 5,793,657 A | 8/1998 | Nemoto | 364/717.01 |
| 5,793,763 A | 8/1998 | Mayes et al. | 370/389 |
| 5,812,819 A | 9/1998 | Rodwin et al. | 395/500 |
| 5,815,664 A * | 9/1998 | Asano | 709/227 |
| 5,835,723 A * | 11/1998 | Andrews et al. | 709/226 |
| 5,862,331 A | 1/1999 | Herriot | 395/200.49 |
| 5,867,495 A | 2/1999 | Elliott et al. | 370/352 |
| 5,867,660 A | 2/1999 | Schmidt et al. | 395/200.57 |
| 5,872,847 A | 2/1999 | Boyle et al. | 380/25 |
| 5,889,774 A | 3/1999 | Mirashrafi et al. | 370/352 |
| 5,892,924 A | 4/1999 | Lyon et al. | 395/200.75 |
| 5,915,008 A | 6/1999 | Dulman | 379/201 |
| 5,918,016 A * | 6/1999 | Brewer et al. | 709/220 |
| 5,933,778 A | 8/1999 | Buhrmann et al. | 455/461 |
| 5,950,195 A | 9/1999 | Stockwell et al. | 707/4 |
| 6,009,474 A * | 12/1999 | Lu et al. | 709/245 |
| 6,011,782 A | 1/2000 | DeSimone et al. | 370/260 |
| 6,055,236 A * | 4/2000 | Nessett et al. | 370/389 |
| 6,055,561 A | 4/2000 | Feldman et al. | 709/200 |
| 6,058,421 A | 5/2000 | Fijolek et al. | 709/225 |
| 6,079,021 A | 6/2000 | Abadi et al. | 713/202 |
| 6,085,249 A * | 7/2000 | Wang et al. | 709/229 |
| 6,098,108 A * | 8/2000 | Sridhar et al. | 709/239 |
| 6,101,189 A | 8/2000 | Tsuruoka | 370/401 |
| 6,101,543 A | 8/2000 | Alden et al. | 709/229 |
| 6,104,711 A | 8/2000 | Voit | 370/352 |
| 6,115,751 A | 9/2000 | Tam et al. | 709/240 |
| 6,134,591 A | 10/2000 | Nickles | 709/229 |
| 6,137,791 A | 10/2000 | Frid et al. | 370/352 |
| 6,157,950 A | 12/2000 | Krishnan | 709/223 |
| 6,160,843 A * | 12/2000 | McHale et al. | 375/222 |
| 6,172,986 B1 | 1/2001 | Watanuki et al. | 370/466 |
| 6,185,184 B1 | 2/2001 | Mattaway et al. | 370/230 |
| 6,195,705 B1 | 2/2001 | Leung | 709/245 |
| 6,212,183 B1 | 4/2001 | Wilford | 370/392 |
| 6,212,563 B1 | 4/2001 | Beser | 709/227 |
| 6,249,820 B1 | 6/2001 | Dobbins et al. | 709/238 |
| 6,266,707 B1 | 7/2001 | Boden et al. | 709/245 |
| 6,269,099 B1 | 7/2001 | Borella et al. | 370/389 |
| 6,282,575 B1 * | 8/2001 | Lin et al. | 709/244 |
| 6,321,336 B1 * | 11/2001 | Applegate et al. | 713/201 |
| 6,353,614 B1 * | 3/2002 | Borella et al. | 370/389 |
| 6,353,891 B1 * | 3/2002 | Borella et al. | 713/201 |
| 6,493,447 B1 * | 12/2002 | Goss et al. | 379/265.09 |
| 6,614,788 B1 * | 9/2003 | Martin et al. | 370/392 |

OTHER PUBLICATIONS

George Tsirtsis, Alan O'Neill, Internet Engineering Task Force, Internet Draft, "NAT Bypass for End 2 End 'Sensitive' Applications," <draft-tsirtsis-nat-bypass-00.txt>, Jan. 1998, pp. 1 to 5.

George Tsirtsis, Pyda Srishuresh, Internet Engineering Task Force, Internet Draft, "Network Address Translation—Protocol Translation" (NAT-PT), <draft-ietf-ngtrans-natpt-04.txt>, Jan. 1999, pp. 1 to 13.

Jeffrey Lo, K. Taniguchi, Internet Engineering Task Force, Internet Draft, "IP Host Network Address (and port) Translation," <draft-ietf-nat-hnat-00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft-borella-aatn-dnat-01.txt>, Oct. 1998, pp. 1 to 21.

P. Srisuresh, G. Tsirtsis, P. Akkiraju, A. Heffernan, Internet Engineering Task Force, Internet Draft, "DNS Extensions to Network Address Translators" (DNS_ALG), <draft-ietf-nat-dns-alg-01.txt>, Oct. 1998, pp. 1 to 24.

P. Srisuresh, Internet Engineering Task Force, Internet Draft "Security for IP Network Address Translator (NAT) Domains," <draft-ietf-nat-security-00.txt.>, Nov. 1998, pp.. 1 to 11.

P. Srisuresh, K. Eg, Internet Engineering Task Force, Internet Draft, "The IP Network Address Translator" (NAT), <draft-rfced-info-srisuresh-05.txt>, Feb. 1998, pp. 1 to 24.

P. Srisuresh, K. Egev, Internet Engineering Task Force, Internet Draft, "Traditional IP Network Address Translator (Traditional NAT)," <draft-ietf-nat-traditional-01.txt>, Oct. 1998, pp. 1 to 17.

P. Srisuresh, Matt Holdrege, Internet Engineering Task Force, Internet Draft, "IP Network Address Translator (NAT) Terminology and Considerations," <draft-ietf-nat-terminology-01.txt>, Oct. 1998, pp. 1 to 28.

Praveen Akkiraju, Yakov Rekhter, Internet Engineering Task Force, Internet Draft, "A Multihoming Solution Using NATs" <draft-akkiraju-nat-multihoming-00.txt>, Nov. 1998, pp. 1 to 32.

R. G. Moskowitz, Internet Engineering Task Force, Internet Draft, "Network Address Translation Issues with IPsec," <draft-moskowitz-net66-vpn-00.txt>, Feb. 6, 1998, p. 1 to 8.

R. Thay, N. Doraswa and R. Gle, Internet Engineering Task Force, Internet Draft "IP Security," <draft-ietf-ipsec-doc-roadmap-02.txt.>, Nov. 1997, pp. 1 to 12.

T. Hain, Internet Engineering Task Force, Internet Draft, "Architectural Implications of NAT," <draft-iab-nat-implications-02.txt>, Oct. 1998, pp. 1 to 14.

W.T. Teo, S.W. Yeow, R. Singh, Internet Engineering Task Force, Internet Draft, "IP Relocation Through Twice Network Address Translators," <draft-ietf-nat-rnat-00.txt>, Feb. 1999, pp. 1 to 20.

W.T. Teo, S.W. Yeow, R. Singh, Internet Engineering Task Force, Internet Draft, "Reverse Twice Network Address Translators (RAT)," <draft-teoyeow-mip-rat-01.txt>, Dec. 1998, pp. 1 to 20.

W.T. Teo, Y. Li, Internet Engineering Task Force, Internet Draft, "Mobile IP Extension for Private Internets Support," <draft-teoyli-mobileip-mvpn-02.txt>, Feb. 1999, pp. 1 to 24.

Yakov Rekhter, Internet Engineering Task Force, Internet Draft, "Implications of NATs on the TCP/IP Architecture," <draft-ietf-nat-arch-implications-00.txt>, Feb. 1999, pp. 1 to 7.

K. Egevang, and P. Francis, Internet Engineering Task Force, ("IETF"), Request for Comments ("RFC") RFC-1631, "The IP Network Address Translator (NAT)", May 1994, pp. 1-10.

Borella, Michael, *Technology Update—Protocol Helps Stretch IPv4 Addresses*, "Network World", vol. 17, No. 3, Jan. 17, 2000, p. 43.

Kent, Stephen, *Evaluating Certification Authority Security*, Aerospace Conference, 1998 IEEE, Online, vol. 4, pp. 319-327 (Mar. 21-23, 1998).

Thayer, Rodney, *Bulletproof IP With Authentication and Encryption IPSec Adds a Layer of Armor to IP*, Data Communications, vol. 26, No. 16, pp. 55-58, 60 (Nov. 21, 1997).

Borella, M., Grabelsky, D., Lo, J., Tuniguchi, K., Internet Engineering Task Force, Internet Draft, "Realm Specific IP: Protocol Specification <draft-ietf-nat-rsip-protocol-.06.txt>", Mar. 2000, pp. 1-48.

Borella, M., Grabelsky, D., Lo, J., Tuniguchi, K., Internet Engineering Task Force, Internet Draft, "Realm Specific IP: Protocol Specification <draft-ietf-nat-rsip-protocol-.07.txt>", Jul. 2000, pp. 1-49.

Montenegro, G., Internet Engineering Task Force, Internet Draft, "RSIP Support for End-to-End IPsec," <draft-ietf-nat-rsip-ipsec-04.txt>, Jul. 2000, pp. 1 to 17.

Borella, M., Lo, J., Grabelsky, D., Montenegro, G., Internet Engineering Task Force, Internet Draft, "Realm Specific IP: Framework <draft-ietf-nat-rsip-framework-.05.txt>", Jul. 2000, pp. 1-30.

Borella, M., Montenegro, G., *RSIP: Address Sharing with End-To-End Security*, USENIX Conference, San Francisco, California, Mar. 9, 2000, pp. 1-9.

Handley, M., et al. *SIP: Session Initiation Protocol*, Network Working Group, Request for Comments 2543, Mar. 1999, pp. 1 to 153.

ITU-T Recommendation H.225.0, *Call Signaling Protocols and Media Stream Packetization for Packet-Based Multimedia Communication Systems*, Series H: Audiovisual and Multimedia Systems—Infrastructure of Audiovisual Services—Transmission Multiplexing and Synchronization, (Feb. 1998).

ITU-T Recommendation H.323, *Packet-Based Multimedia Communications Systems*, Series H: Audiovisual and Multimedia Systems—Infrastructure of Audiovisual Services—Systems and Terminal Equipment for Audiovisual Services, (Feb. 1998).

McCanne et al., "The BSD Packet Filter: A New Architecture for User-Level Packet Capture," Proceedings of the 1993 Winter USENIX Technical Conference (Jan. 1993).

Postel, J., *User Datagram Protocol*, Request for Comments 768, Aug. 1980, pp. 1 to 3.

Postel, J., *Internet Protocol*, Request for Comments 791, Sep. 1981, pp. 1 to 45.

Postel J., *Internet Control Message Protocol*, Request for Comments 792, Sep. 1981, pp. 1 to 21.

Postel, J., *Transmission Control Protocol*, Request for Comments 793, Sep. 1981, pp. i to 84.

Postel, J., *File Transfer Protocol (FTP)*, Request for Comments 959, Oct. 1985, pp. 1 to 69.

Jacobson, V., *TCP Extensions for High Performance*, Request for Comments 1323, May 1992, pp. 1 to 37.

Droms, R., *Dynamic Host Configuration Protocol*, Request for Comments 2131, Mar. 1997, pp. 1 to 45.

Stevens, W., *Advanced Sockets API for IPv6*, Request for Comments 2292, Feb. 1998, pp. 1 to 67.

Gilligan, R. et al., *Basic Socket Interface Extensions for IPv6*, Request for Comments 2553, Mar. 1999, pp. 1 to 41.

Srisuresh, P., et al., *IP Network Address Translator (NAT) Terminology and Considerations*, Request for Commments 2663, Aug. 1999, pp. 1 to 30.

Maurice J. Bach, The Design of the Unix Operating System, Prentice Hall Software Series, 1986, pp. 382-390.

"Cisco IOS Release 12.0 Network Protocols Configuration Guide, Part 1", Configuring IP Addressing, Cisco Systems, 1998, pp. P1C-7 to P1C-58.

Durand, Alain, *Deploying Ipv6*, IEEE Internet Computing, http://computer.org/internet, Jan.-Feb. 2001, pp. 79-81.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14-18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP-Based IP Telephony System, *IEEE Communications Magazine*, vol. 37, No. 7, Jul. 1999, pp. 96-101. (8 total pages).

Handley/Schulzrinne/Schooler/Rosenberg, SIP: Session Initiation Protocol, Internet Engineering Task Force, draft-ietf-sip-rfc2543bis-02.ps. Sep. 4, 2000. (131 pages).

Borella, M., Lo, J., Grabelsky, D., Montenegro, G., IETF Proceedings presentation, Realm Specific IP: Protocol Specification <draft-nat-rsip-protocol-00.txt>, Apr. 9, 1999 (13 pages).

Marsan, Carolyn Duffy, The Next Best Things to Ipv6? Network World Fusion at http://www.nbwfusion.com/news/1999/0920ipv6.html, Mar. 29, 2000, pp. 1-3.

Borella, M., Lo, J., Grabelsky, D., Montenegro, G., Internet Engineering Task Force, Internet Draft, "Realm Specific IP: Framework <draft-ietf-nat-rsip-framework-.04.txt>", Mar. 2000, pp. 1-30.

IETF Mar. 1999 Proceedings, 2.7.10 Network Address Translators (nat), pp. 1-13.

Rosenberg, Jonathan D. and Shockey, Richard, The Session Initiation Protocol (SIP): A Key Component for Internet Telephony, ComputerTelephony.com, Jun. 2000, pp. 124-139.

Fenner, W., *Internet Group Management Protocol Version 2*, RFC 2236, Nov. 1997, pp. 1-24.

Mogul, J. et al., *"Internet Standard Subnetting Procedure"*, RFC 950, Aug. 1985, pp. 1-18.

Schulzrinne et al., *"RTP: A Transport Protocol for Real-Time Applications"*, RFC 1889, pp. 1-75.

Privat, Jermone, *"Double Phase DHCP Configuration"*, <draft-privat-dhc-doublephase-01.txt>, Internet Engineering Task Force, Sep. 1999, pp. 1-4.

Maughan, D. et al., *"Internet Security Association and Key Management Protocol"*, RFC 2408, Nov. 1998, pp. 1-86.

Karn, P., *"Photuris Session-Key Management Protocol"*, RFC 2522, Mar. 1999, pp. 1-58.

*"Random Number Generators"*, Computational Science Education Project, 1991, 1992, 1993, 1994 and 1995.

Foster, Ian, *"10 Random Numbers"*, 1995.

Borella, Michael et al., *"Realm Specific IP: Protocol Specification"*, <draft-ietf-nat-rsip-protocol-02.txt>, Internet Draft, Aug. 1999, pp. 1-27.

Gilligan, R. et al., *"Transition Mechanisms for IPv6 Hosts and Routers"*, RFC 1933, Apr. 1996, pp. 1-22.

Afifi, H. et al., *"Method for IPv4-IPv6 Transition"*, Proceedings IEEE International Symposium on Computers and Communications, Jul. 6-8, 1999, pp. 478-484.

\* cited by examiner

REGISTER RESPONSE MESSAGE LAYOUT

| VERSION | MESSAGE TYPE | OVERALL LENGTH | |
|---|---|---|---|
| CODE | LENGTH | VALUE | CLIENT ID |
| CLIENT ID VALUE (CONT'D) | | CODE | FLOW |
| LENGTH | LOCAL | REMOTE | POLICY |
| CODE | LENGTH | VALUE | RSIP METHOD |
| CODE | LENGTH | VALUE | TUNNEL TYPE |

4 BYTES

FIG. 7

ASSIGN REQUEST MESSAGE LAYOUT

| VERSION | TYPE | LENGTH | |
|---|---|---|---|
| CODE | LENGTH | VALUE | CLIENT ID |
| CLIENT ID VALUE (CONT'D) | | CODE | |
| LENGTH | TYPE | | LOCAL |
| VARIABLE LENGTH VALUE | | | ADDRESS |
| METHOD DEPENDENT FIELDS | | | |

4 BYTES

FIG. 8

RSA-IP ASSIGN REQUEST MESSAGE LAYOUT

| CODE | LENGTH | TYPE | REMOTE ADDRESS |
|------|--------|------|----------------|
| VARIABLE LENGTH VALUE ||| |
| CODE | LENGTH | NUMBER | REMOTE PORTS |
| VARIABLE NUMBER OF 2 BYTE PORT FIELDS ||| |
| CODE | LENGTH | VALUE | [LEASE TIME] |
| LEASE TIME VALUE CONT'D || CODE | [TUNNEL TYPE] |
| LENGTH | VALUE | | |

4 BYTES

FIG. 9

RSAP-IP ASSIGN REQUEST MESSAGE LAYOUT

| CODE | LENGTH | NUMBER | LOCAL PORTS |
|------|--------|--------|-------------|
| VARIABLE NUMBER OF 2 BYTE PORT FIELDS ||| |
| CODE | LENGTH | TYPE | REMOTE ADDRESS |
| VARIABLE LENGTH VALUE ||| |
| CODE | LENGTH | NUMBER | REMOTE PORTS |
| VARIABLE NUMBER OF 2 BYTE PORT FIELDS ||| |
| CODE | LENGTH | VALUE | [LEASE TIME] |
| LEASE TIME VALUE CONT'D || CODE | [TUNNEL TYPE] |
| LENGTH | VALUE | | |

4 BYTES

FIG. 10

ASSIGN RESPONSE MESSAGE LAYOUT

| VERSION | TYPE | LENGTH | |
|---|---|---|---|
| CODE | LENGTH | VALUE | CLIENT ID |
| CLIENT ID VALUE (CONT'D) | | CODE | |
| LENGTH | VALUE | | BIND ID |
| BIND ID VALUE CONT'D | CODE | LENGTH | LOCAL |
| LENGTH CONT'D | TYPE | VARIABLE LENGTH VALUE | ADDRESS |
| METHOD DEPENDENT FIELDS | | | |

4 BYTES

FIG. 11

RSA-IP ASSIGN RESPONSE MESSAGE LAYOUT

| CODE | LENGTH | TYPE | REMOTE |
|---|---|---|---|
| VARIABLE LENGTH VALUE | | | ADDRESS |
| CODE | LENGTH | NUMBER | REMOTE |
| VARIABLE NUMBER OF 2 BYTE PORT FIELDS | | | PORTS |
| CODE | LENGTH | VALUE | LEASE TIME |
| LEASE TIME VALUE CONT'D | | CODE | TUNNEL |
| LENGTH | VALUE | | TYPE |

4 BYTES

FIG. 12

METHOD FOR ADDRESS MAPPING IN A NETWORK ACCESS SYSTEM AND A NETWORK ACCESS DEVICE FOR USE THEREWITH

RELATED APPLICATIONS

This application is a continuation in part of U.S. application Ser. No. 09/035,600, filed Mar. 5, 1998, issued as U.S. Pat. No. 6,353,614.

BACKGROUND OF THE INVENTION

A. Field of the Invention

The present invention relates to computer networks. More specifically, the invention relates to a method for assigning a public Internet Protocol ("IP") address from an address server on a network to a Realm Specific Internet Protocol aware host on the network having a private IP address.

B. Description of the Related Art

The IP is an addressing protocol designed to route traffic within a network or between networks. Current versions of IP such as IP version 4 ("Ipv4") are becoming obsolete because of limited address space. With a 32-bit address-field, it is possible to assign 232 different addresses, which is U.S. Pat. No. 4,294,967,296, or greater than 4 billion possible addresses. A unique IP number is typically assigned to network devices on a network using IP, whether or not the network is connected to the Internet. Most organizations, such as corporations and universities have multiple networks using IP, with multiple network devices assigned an IP address. With the explosive growth of the Internet and intranets, IP addresses using a 32-bit address-field may soon be exhausted. IP version 6 ("IPv6") proposes the use of a 128-bit address-field for IP addresses. However, a large number of networks including a large number of Internet nodes will still be using older versions for IP with a 32-bit address space for many years to come.

The sharing of a public IP address among multiple hosts is a useful method in cases where a local area network (LAN) is comprised of multiple IP hosts, but possess only a limited number of public IP addresses that reside at a router. Such a network is referred to as a stub network. Each local host on the stub network has only a private (internal) IP address. When communicating amongst themselves, local hosts use their local IP addresses. However, for communications with the public (external) IP network, some form of address mapping/sharing must be implemented in order to allow the local hosts to send/receive packets to/from entities on the external IP network.

Network access systems ("NAS") generally consist of multiple device subsystems, such as modem cards, which reside in a chassis, and are connected by one or more internal communications systems, such as a communications bus. A larger NAS may consist of multiple chassis connected in a LAN, or some local communications system. Typically, the entire NAS provides one or a few public IP interfaces, usually associated with a router card or subsystem, for communications with the external IP network. Devices on the external IP network can communicate with the NAS through these one or a few interfaces. In certain cases, it is desirable to partition and group the internal NAS resources in such a way to make it appear as multiple, virtual NAS systems to devices on the external IP network. It may even be desirable to make each internal device subsystem individually addressable on the external, public IP network. One way to accomplish this is to implement an IP stack on each internal device subsystem, connect them with an internal LAN, and provide external access by incorporating routing functionality at the NAS's external IP interface. In such a configuration, the internal IP network may also provide the internal communications for the system, or augment some other bus-like system. If the IP addresses of the internal device subsystems are only private, then the internal LAN can be viewed as a stub network. In this case, some form of address mapping/sharing must be implemented to enable the internal, subsystem devices to communicate with the external IP network as IP devices.

Network address translation ("NAT") has been proposed to extend the lifetime of Internet Protocol ("IP") version 4 ("IPv4") and earlier versions of IP by allowing a network to exist behind a set of public IP addresses. See P. Srisureh, "IP Network Address Translator (NAT) Terminology and Considerations," IETF RFC 2663, August 1999, which is incorporated herein by reference. NAT provides a method for transparent bi-directional communication between a private routing realm, for example a private intranet, and an external routing realm, for example, the Internet. Through use of NAT, addresses of packets sent by the first realm are translated into addresses associated with the second realm. Use of private IP addresses in conjunction with a NAT implementation in a network address server allows the ISP to conserve globally-routable public IP addresses. When a device or node using private addressing desires to communicate with the external world, a private address is translated to a common public IP address used for communication with an external network by a NAT device.

There are several problems associated with using NAT to extend the life of IP. NAT interferes with the end-to-end routing principle of the Internet that recommends that packets flow end-to-end between network devices without changing the contents of any packet along a transmission route. (see e.g., Routing in the Internet, by C. Huitema, Prentice Hall, 1995) Problems with NAT support for end-to-end protocols, especially those that authenticate or encrypt portions of data packets, are particularly well-known. See, e.g., Holdrege et al., "Protocol Complications with the IP Network Address Translator," Internet Draft <draft-ietf-nat-protocol-complications-01>, June 1999. In applications that transmit IP addresses in packet payloads, NAT requires an application layer gateway to function properly. NAT also creates difficulties when applied to Internet security applications.

Current versions of NAT replace a private network address in a data packet header with an external network address on outbound traffic, and replace an external address in a data packet header with a private network address on inbound traffic. This type of address translation is computationally expensive, causes security problems by preventing certain types of encryption from being used, or breaks a number of existing applications in a network that cannot do NAT (e.g., File Transfer Protocol ("FTP")).

Current versions of NAT also may not gracefully scale beyond a small network containing a few dozen nodes or devices because of the computational and other resources required. NAT potentially requires support for many different internal network protocols be specifically programmed into a translation mechanism for external protocols in a NAT device such as a NAT router. As is known in the art, a router translates differences between network protocols and routes data packets to an appropriate network node or network device. Computational burdens placed on a NAT router may be significant and degrade network performance, especially if several NAT-enabled stub networks share the same NAT router. In a worst case scenario, a NAT router translates every inbound and outbound data packet.

Realm Specific Internet Protocol (RSIP) has been proposed as an alternative for NAT. See M. Borella et al., "Realm Specific IP: Protocol Specification," Internet Draft <draft-ietf-nat-rsip-protocol-06>, March 2000 (hereinafter "RSIP-PROTOCOL"), which is incorporated herein by reference. Using RSIP, a host and a gateway negotiate the use of a public IP address and possibly some number of Transmission Control Protocol (TCP)/User Datagram Protocol (UDP) ports. As is known in the art, Transmission Control Protocol ("TCP") and User Datagram Protocol ("UDP") are often used over IP in computer networks. TCP provides a connection-oriented, end-to-end reliable protocol designed to fit into a layered hierarchy of protocols that support multi-network applications. UDP provides a transaction oriented datagram protocol, where delivery and duplicate packet protection are not guaranteed. After enabling RSIP in the host, the RSIP-aware host can utilize one or more public IP addresses residing on the RSIP gateway. An important capability of RSIP compared with other methods such as NAT, is that local host devices may terminate IPsec with external IP entities, even while they share the single public address of the LAN router device.

RSIP requires that an application on the host communicate with an application on the RSIP gateway, so the communication link must be configured for IP before this communication occurs. The RSIP client must also know the IP address of the RSIP gateway, so that it can contact the gateway directly. Thus, there is a need in the art for a method by which an RSIP host can determine the IP address of an RSIP gaetway. There is also a need in the art for a process by which a network device and a network server may use RSIP to assign public IP addresses from the server to the network device in order to conserve globally-routable IP addresses.

SUMMARY OF THE INVENTION

In accordance with an illustrative embodiment of the present invention, the problems associated with NAT are overcome. A device and method for implementing Realm Specific Internet Protocol ("RSIP") in a network access system is provided.

In accordance with a first aspect of the invention, a network access address mapping system is provided. The network access address mapping system includes a plurality of first network subdevices, and a second network subdevice. The plurality of first network subdevices is connected on a first network by a common communications path. Each of the first network subdevices has a private network address for communicating with the network subdevices on the first network. The second network subdevice has a private network address, a public network address, and one or more ports. The private network address of the second network subdevice is used for communication with the network subdevices on the first network. The public network address of the second network subdevice is used for communicating with network devices on an external public network. The combination network address includes the public network address and is used for identifying any of the first network subdevices during communication with network devices on the external network. The first network subdevices request allocation of the public network address and one or more ports from the second network subdevice for communication with network devices on the external network.

In one embodiment, the first and second network subdevices and the first network comprise a stub network. In a further preferred embodiment, the first and second network subdevices and the first network comprise a single, self-contained network device. In a further preferred embodiment, the first and second network subdevices comprise cards in a rack having a common backplane. In a further preferred embodiment, the first network devices in the network access server are positioned in a plurality of chassis.

In an exemplary embodiment of the invention, the first and second network devices are Internet protocol-addressable devices, the private and public addresses are Internet protocol ("IP") addresses, and the first and second networks are IP networks. In this embodiment, the public IP address is a globally unique IP address.

In accordance with a second aspect of the invention, a method for implementing RSIP in the network access system of the invention is provided. The method of the invention comprises the steps of requesting by a first network subdevice having a private network address a public network address and one or more ports from a second network subdevice having a private network address and a public network address; receiving the public network address and the one or more ports by the first network subdevice from the second network subdevice; updating an address-to-address table maintained in the second network subdevice to reflect allocation of the public network address and the one or more ports to the first network subdevice, and creating a combination network address comprising the public network address and the one or more ports to identify the first network subdevice during communications with network devices on an external network.

The foregoing and other aspects and advantages of illustrative embodiments of the present invention will be more readily apparent from the following detailed description, which proceeds with references to the accompanying drawings.

BRIEF DESCRIPTION OF THE DRAWINGS

Presently preferred embodiments of the invention are described with reference to the following drawings, wherein:

FIG. 7 is a block diagram illustrating a register response message layout;

FIG. 8 is a block diagram illustrating an assign request message layout;

FIG. 9 is a block diagram illustrating an assign request message layout for an embodiment in which the RSIP type is RSA-IP;

FIG. 10 is a block diagram illustrating an assign request message layout for an embodiment in which the RSIP type is RSAP-IP;

FIG. 11 is a block diagram illustrating an assign response message layout;

FIG. 12 is a block diagram illustrating an assign response message layout for an embodiment in which the RSIP type is RSA-IP;

DETAILED DESCRIPTION OF THE PRESENTLY PREFERRED EMBODIMENTS

Figure 1:
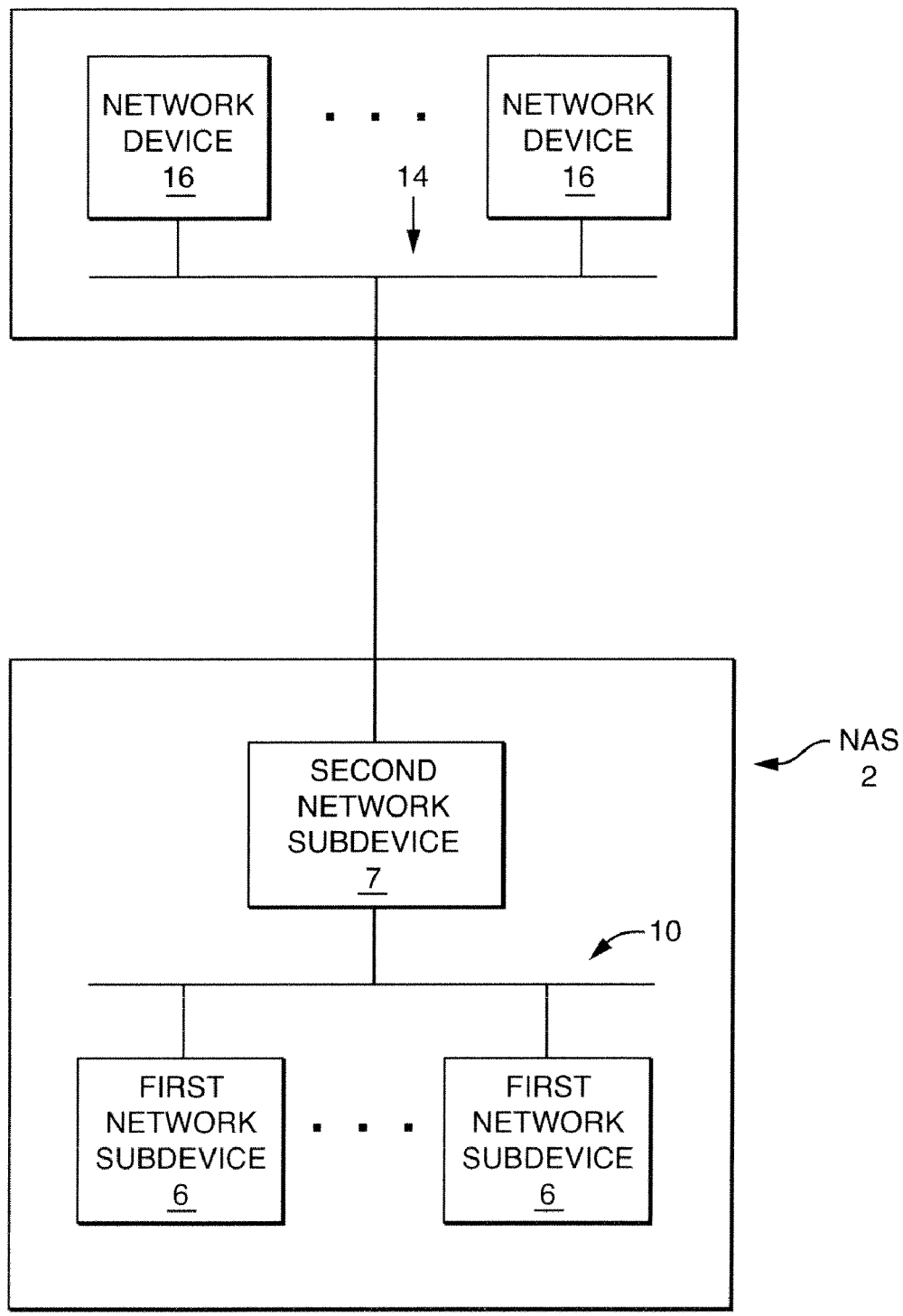
FIG. 1 is a block diagram illustrating a network access system using Realm Specific Internet Protocol.

FIG. 1 shows the high-level architecture of a network access system ("NAS") 2. In the figure, NAS 2 comprises a number of individually addressable first network subdevices 6 having a common communications path 8 connected together by an internal private network 10. External public addressability is provided via one or a few public interfaces on a second network subdevice 7. Network subdevices 6 and 7 communicate with an external public network 14, such as the Internet, or a second private network, via the public interfaces 12 using one or a few a common globally unique network address 44. The invention, however, is not limited to these external networks, and those of skill in the art will recognize the utility of the invention for transmission of data over any packet based network. Communications between the internal private network 10 and the external public network 14 may take place over the public-switched telephone network ("PSTN"), a cable television network, or any other suitable network or medium.

In a preferred embodiment, NAS 2 comprises a first network subdevice 6 having a private network address 9 that requests the assignment of a public network address 11 from a second network subdevice 7 using a first protocol 13. In a preferred embodiment, the internal and external networks 10 and 14 are IP networks, the network subdevices 6 and 7 are IP addressable, the public interfaces 12 are IP interfaces, private and public network addresses 9 and 11 are IP addresses, and the first protocol 13 used for requesting assignment of a public network address 11 is Realm Specific Internet Protocol.

Figure 2:
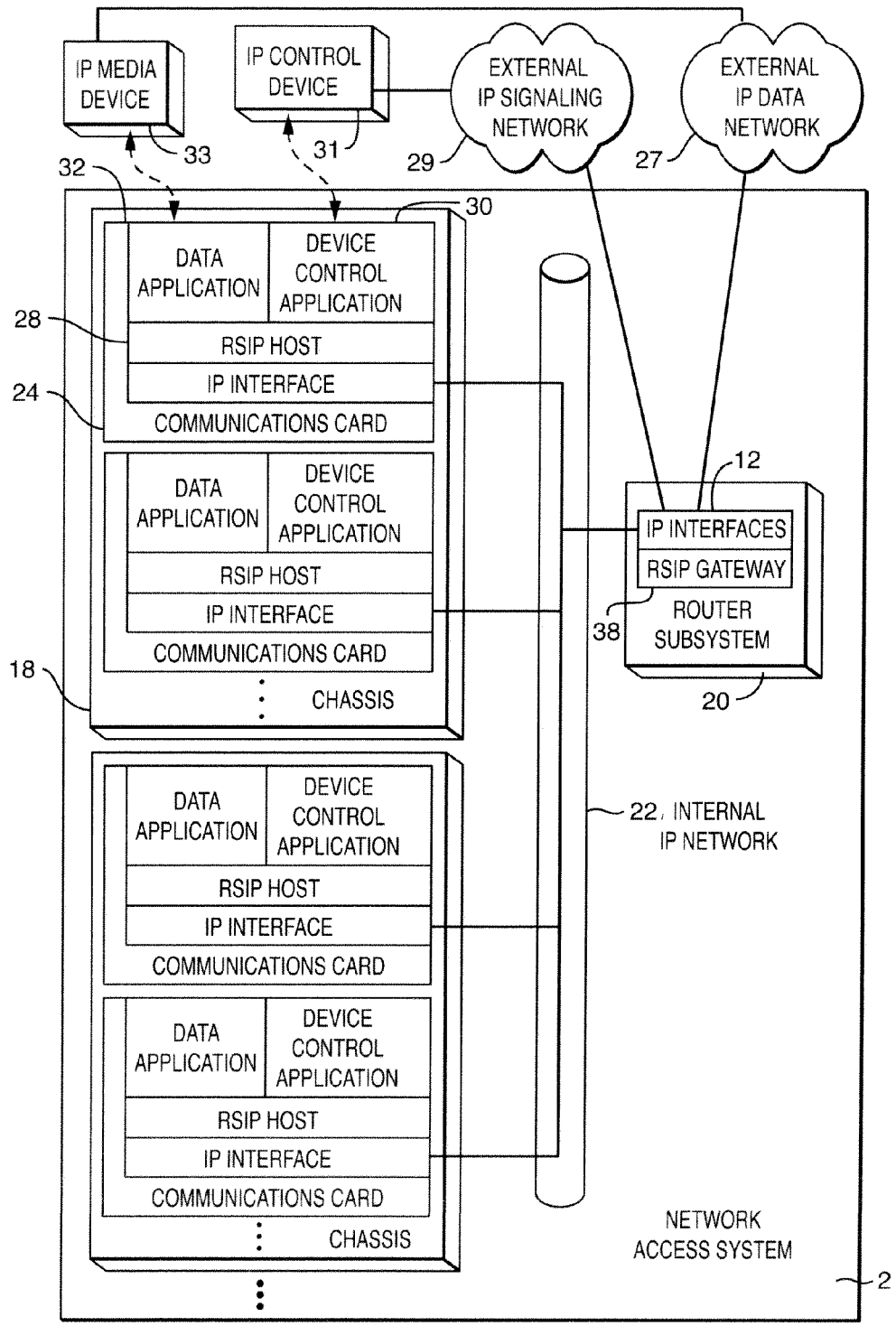
FIG. 2 is a block diagram illustrating a preferred embodiment of the network access system of FIG. 1.

In one preferred embodiment, as shown in FIG. 2, the first network subdevice 6 comprises a chassis 18 housing one or a plurality of communications cards 24, and the second network subdevice 7 comprises a router subsystem 20. The first network subdevice 6 and the second network subdevice 7 communicate via an internal IP network 10. Each communications card 24 further preferably comprises an IP interface 26, an RSIP host 28, a device control application ("DCA") 30, and a data application 32. The IP interface 26 on the communication card 24 is connected to the internal IP network 10. The router subsystem 20 preferably comprises one or more IP interfaces 12. In one preferred embodiment, the router subsystem 20 comprises three IP interfaces 12: one connected to the internal IP network 10, and one each to an external data network 27 and an external IP signaling network 29. Preferably, NAS 2 is a self-contained unit; however other configurations are possible, and the invention is not limited to this embodiment.

Preferred embodiments of NAS 2 may include additional sub-components and elements, as well as additional public IP interfaces 12. In particular, reference to any specific network access elements are completely omitted from FIG. 2. It should also be understood that the external networks shown in the figure need not be separate networks; nor is there any implied limitation on the number of external networks.

As used herein, the term "RSIP client" refers to an application that runs the client side of the RSIP protocol. As used herein, the term "RSIP host" refers to the physical device where the RSIP client application resides. Referring to FIG. 2, the RSIP host of NAS 2 corresponds to a communications card 24. As used herein, the term "RSIP server" refers to an application that runs the server side of the RSIP protocol. As used herein, the term "RSIP gateway" refers to the physical device where the RSIP server application resides. Referring to FIG. 2, the RSIP gateway of NAS 2 corresponds to the router subsystem 20.

An operating environment for network devices and routers of the present invention includes a processing system with at least one high speed Central Processing Unit ("CPU") and a memory. In accordance with the practices of persons skilled in the art of computer programming, the present invention is described below with reference to acts and symbolic representations of operations that are performed by the processing system, unless indicated otherwise. Such acts and operations may be referred to as being "computer-executed" or "CPU executed."

It will be appreciated that acts and symbolically represented operations include the manipulation of electrical signals by the CPU. The memory locations where data bits are maintained are physical locations that have particular electrical, magnetic, optical, or organic properties corresponding to the data bits.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which may exist exclusively on the processing system or may be distributed among multiple interconnected processing systems that may be local or remote to the processing system.

In network address translation schemes known in the prior art, the router subsystem 20 translates an internal network address, such as an internal IP address used on the internal IP network 10, to an external network address such as an IP address for outgoing traffic to the external IP data network 14. The router subsystem 20 also translates an external network address to an internal network address for incoming traffic from external IP data network 14. A NAT router assumes the entire computational burden for network address translation. For large stub networks having 50 or more network devices or subdevices, the NAT router may become a bottleneck. In the worst case, every packet passing through the NAT router requires address translation.

In an illustrative embodiment of the present invention, Realm Specific Internet Protocol ("RSIP") is used to overcome the difficulties associated with NAT. In a preferred embodiment of the invention, the first network subdevices 6 on the internal IP network 10 request a globally unique public network address from the second network subdevice 7, as well as a set of locally unique ports, for external communication with the external network 14, such as an external IP data network. The second network subdevice 7 then creates a combination network address 112 comprising the globally unique network address and the locally unique ports, to identify information transmitted to and from the first network subdevice 6.

RSIP Protocol Stack

Figure 3:
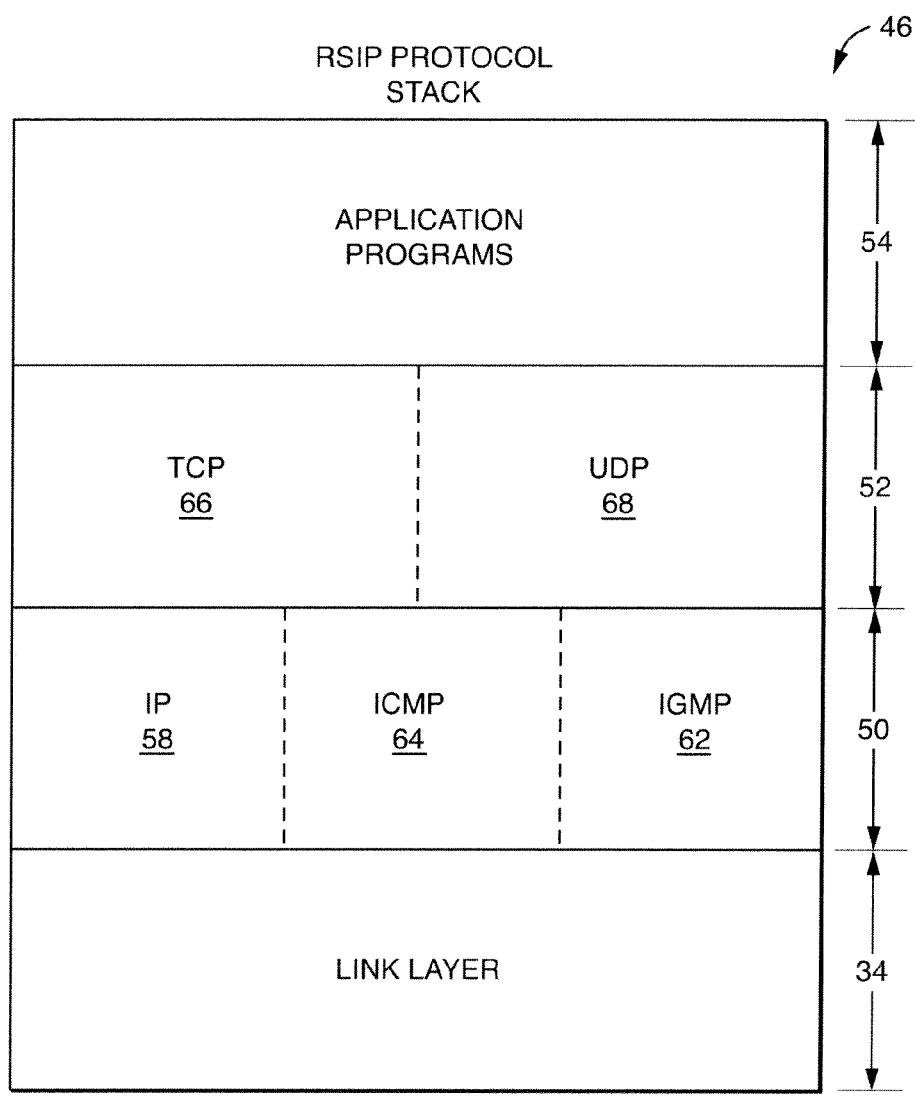
FIG. 3 is a block diagram illustrating a protocol stack for a network subdevice.
Figure 4:
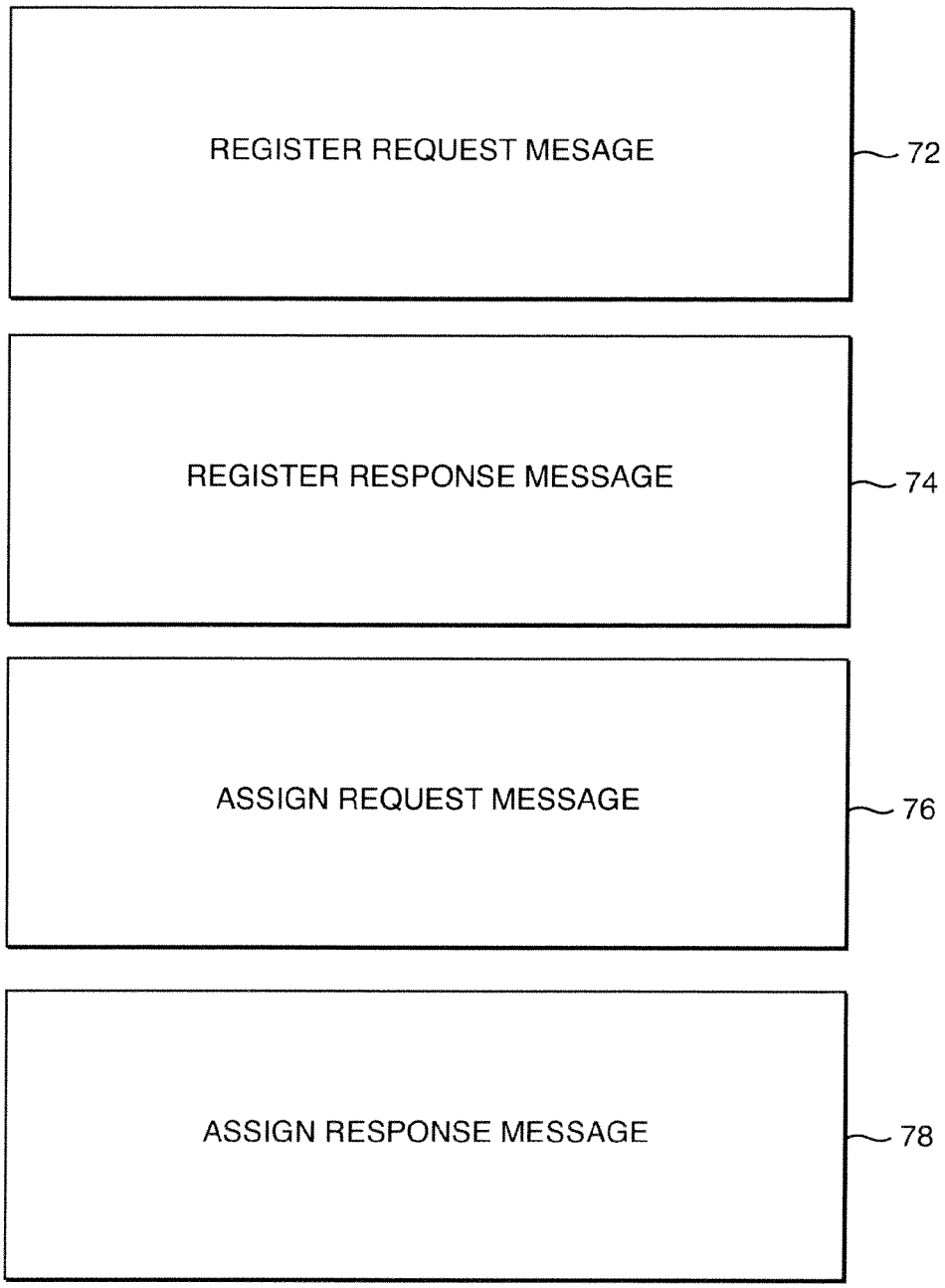
FIG. 4 is a block diagram illustrating a group of Realm Specific Internet Protocol messages.

FIG. 3 is a block diagram illustrating a layered protocol stack 46 for a communications card 24 on internal IP network 10 used for RSIP. The layered protocol stack 46 is described with respect to Internet Protocol suites comprising from lowest-to-highest, a link layer 48, a network layer 50, a transport layer 52 and an application layer 54. However, more or fewer layers could alternatively be used, and different layer designations could also be used for the layers in the protocol stack 46 (e.g., layering based on the Open Systems Interconnection ("OSI") model).

The network layer 50 includes an IP layer 58 (hereinafter "IP 58"), an Internet Group Management Protocol ("IGMP") layer 62, and a Control Message Protocol ("ICMP") layer 64, and may also include a RSIP layer 60 (not shown). As is known in the art, the IP 58 is an addressing protocol designed to route traffic within a network or between networks. The IP 58 is described in RFC-791, J. Postel, *Internet Protocol*, Sep. 1, 1981, incorporated herein by reference.

Above the network layer 50 is a transport layer 52. The transport layer 52 includes a Transmission Control Protocol ("TCP") layer 58 and a User Datagram Protocol ("UDP") layer 68.

The RSIP gateway 38 allocates locally unique ports to a first network subdevice 6 having, the RSIP layer 60. In one embodiment of the present invention, the RSIP layer 60 is a separate protocol layer in the network layer 50. In another embodiment of the present invention, the RSIP layer 60 is implemented as part of the ICMP layer 64 and is not a separate protocol layer. In yet another embodiment of the present invention, the RSIP layer 60 is run over either a Transmission Control Protocol or User Datagram Protocol. The RSIP layer 60 is explained below.

The IGMP layer 62, hereinafter IGMP 62, is responsible for multicasting. For more information on the IGMP 62, see RFC-2236, W. Fenner, *Internet Group Management Protocol, Version* 2, November 1997, incorporated herein by reference.

The ICMP layer 64, hereinafter ICMP 64, is used for Internet Protocol control. The main functions of the ICMP 64 include error reporting, reachability testing (e.g., "pinging"), route-change notification, performance, subnet addressing and other maintenance. For more information on the ICMP 64, see RFC-950, J. C. Mogul and J. Postel, *Internet Standard Subnetting Procedure*, Aug. 1, 1985, incorporated herein by reference.

The TCP layer 66, hereinafter TCP 66, provides a connection-oriented, end-to-end reliable protocol designed to fit into a layered hierarchy of protocols which support multi-network applications. The TCP 66 provides for reliable inter-process communication between pairs of processes in network devices attached to distinct but interconnected networks. For more information on the TCP 66, see RFC-793, J. Postel, Transmission Control Protocol, Sep. 1, 1981, incorporated herein by reference.

The UDP layer 68, hereinafter UDP 68, provides a connectionless mode of communications with datagrams in an interconnected set of computer networks. The UDP 68 provides a transaction oriented datagram protocol, where delivery and duplicate packet protection are not guaranteed. For more information on the UDP 68, see RFC-768, J. Postel, *User Datagram Protocol*, Aug. 28, 1980, incorporated herein by reference. Both the TCP 66 and the UDP 68 are not required in protocol stack 42; either the TCP 66 or the UDP 68 can be used without the other.

Above the transport layer 52 is an application layer 54 where application programs to carry out desired functionality for a network device reside.

More or fewer protocol layers may alternatively be used in the protocol stack 42.

RSIP Protocol

Figure 5:
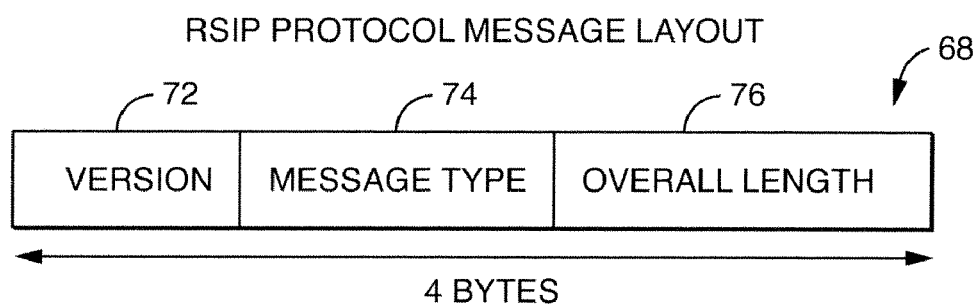
FIG. 5 is a block diagram illustrating a Realm Specific Internet Protocol message layout.

FIG. 5 is a block diagram illustrating the general layout for an RSIP protocol message. The RSIP protocol 70 includes a register request message 72, a register response message 74, an assign request message 76 and an assign response message 78. Each RSIP protocol 70 message is in type-length-value ("TLV") format. Additional messages may also be used for RSIP protocol messages, as described in RSIP-PROTOCOL.

As shown in FIG. 5, each RSIP protocol 70 message comprises a header 80 including three mandatory fields followed by required parameters 82. The mandatory fields comprise a version field 83, a message type field 84, and an overall length field 85. The version field 83 is one byte and indicates the version of RSIP being used. The message type field 84 is one byte and indicates the specific message type, e.g. a value of 2 may indicate a register request message 72, 3 may indicate a register response message 74, etc. The overall length field 85 is two bytes and indicates the length of the entire message, including the header 80. The required parameters 82 each comprise a one byte code field 86, a two byte length field 87, and a variable length value field 88. The length field 87 specifies the length of the value field 88 only.

Figure 6:
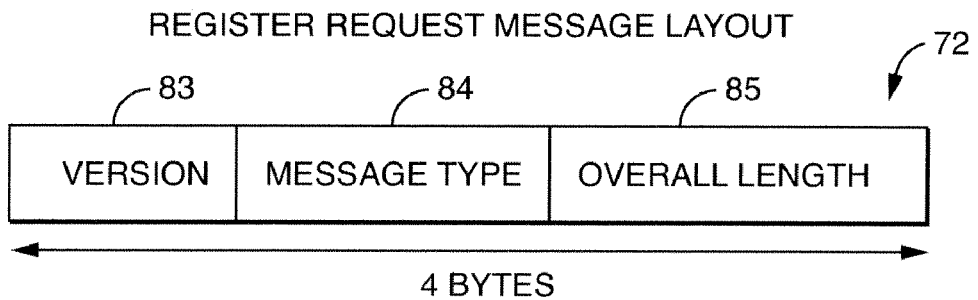
FIG. 6 is a block diagram illustrating a register request message layout.

In an illustrative embodiment of the present invention, the register request message 72 is sent from the RSIP host 28 to the RSIP gateway 38 to request a globally unique IP address 44 and a block of locally unique ports 42. FIG. 6 is a block diagram illustrating a register request message 72 layout, which comprises header 80.

In one embodiment of the present invention, the RSIP host 28 transmits the register request message 72 upon boot. The RSIP protocol 70 can exist as a separate protocol or can be integrated into an known configuration protocol, for example Dynamic Host Configuration Protocol ("DHCP"). DHCP 89 is a protocol for passing configuration information such as IP addresses to hosts on a network. For more information on DHCP 89 see RFC-2131, R. *Droms, Dynamic Host Configuration Protocol*, March 1997, incorporated herein by reference. The format of DHCP 89 messages is based on the format of BOOTP messages described in RFC-951 and RFC-1542, incorporated herein by reference. From a network device's point of view, DHCP 89 is an extension of the BOOTP mechanism.

In another embodiment of the present invention, the RSIP host 28 requests a globally unique IP address 44 and locally unique ports 42 after boot when a protocol layer in layered protocol stack 46 makes an initial request for an external network 14. The RSIP host 28 may also request a globally unique address 44 and locally unique ports 42 when the number of globally unique addresses 44 and locally unique ports 42 required falls below the number of globally unique addresses and ports allocated.

The register response message 74 is sent from the RSIP gateway 38 back to the RSIP host 28 either confirming or denying the register request message 72. FIG. 7 is a block diagram illustrating a register response message 74 layout. The register response message 74 comprises header 80 followed by required parameters client ID 90 and flow policy 92. Register response message 74 may also include optional parameters for RSIP type 94 and tunnel type 96. Client ID parameter 90 has a code field 86 value of 4 and a length of four bytes.

Flow policy parameter 92 has a code field 86 value of 9 and a length of two bytes, the first byte of which specifies the local flow policy and the second byte of which specifies the remote flow policy. Flow policies are described in greater detail in RSIP-PROTOCOL.

Optional RSIP type parameter 94 has a code field 86 value of 7 and a length of one byte. This byte specifies whether Realm Specific Address IP (RSA-IP) or Realm Specific Address and Port IP (RSAP-IP) will be used. In RSA-IP, the RSIP gateway 38 allocates each RSIP host 28 a globally unique public IP address 44, and may allocate a number of locally unique ports 42 not associated with the unique public IP address. In RSAP-IP, the RSIP gateway 38 allocates each RSIP host 28 a globally unique public IP address 44 and a number of locally unique ports 44 associated with the address.

Optional tunnel type parameter 96 has a code field 86 value of 6 and a length of one byte. Possible tunnel types specified by this parameter include IP-IP (value of 1), GRE (value of 2), and L2TP (value of 3).

Upon receiving a successful register response message 74, the RSIP host 28 sends an assign request message 76 to RSIP gateway 38. FIG. 8 is a block diagram illustrating a assign request message 76 layout. The assign request message 76 comprises a header 80 followed by required parameters client ID 90 and an address and port parameters 98. As shown in FIG. 9, if the system is using RSA-IP, the address and port parameters 98 comprise mandatory parameters for local address 100, remote address 102, and remote ports 43, and optional parameters for lease time 106 and tunnel type 96. Optional parameters are indicated by brackets. As shown in FIG. 10, if the system is using RSAP-IP, the address and port parameters 98 comprise mandatory parameters for local address 100, local ports 42, remote address 102, and remote ports 43, and optional parameters for lease time 106 and tunnel type 96. Optional parameters are indicated by brackets.

The address parameters 100 and 102 have a one byte code field 86 with a value of 1 and a two byte length field 87 that specifies the remaining length of the message. The first byte of the length is a type field and the remaining length is a value field. The length of the value field 88 depends on the type of address selected.

The port parameters 42 and 43 have a one byte code field 86 with a value of 2 and a two byte length field 87 that specifies the remaining length of the message. The first byte of the length is a one byte number field that specifies the number of ports. The remaining length consists of one or more two byte port fields that specify the ports to be allocated.

The lease time parameter 106 has a one byte code field 86 with a value of 3 and a four byte length field 87 that specifies the remaining length of the message. The value in the remaining length specifies the amount of time that the binding will remain active.

Figure 13:
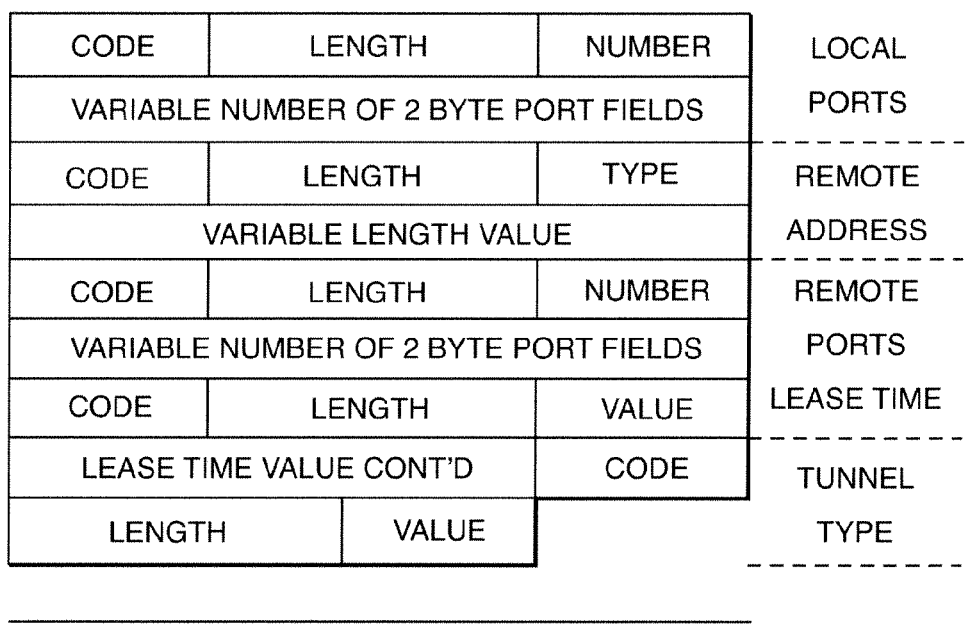
FIG. 13 is a block diagram illustrating an assign response message layout for an embodiment in which the RSIP type is RSAP-IP.

The Assign response message 78 is sent from the RSIP gateway 38 back to the RSIP host 28 with a globally unique public IP address and one or more locally unique ports for use by the RSIP host 28. FIG. 11 is a block diagram illustrating an assign response message 78 layout. The assign response message 78 comprises header 80 followed by required parameters client ID 90, bind ID 110, and address and port parameters 98. As shown in FIG. 12, if the system is using RSA-IP, the address and port parameters 98 comprise mandatory parameters for local address 100, remote address 102, remote ports 43, lease time 106 and tunnel type 96. As shown in FIG. 13, if the system is using RSAP-IP, the address and port parameters 98 comprise mandatory parameters for local address 100, local ports 42, remote address 102, remote ports 43, lease time 106 and tunnel type 96. Note that the lease time and tunnel type parameters are mandatory in the Assign response message 78, while they are optional in the assign request message 76.

Once the RSIP gateway 38 assigns a globally unique public IP address 44 and one or more locally unique ports 42 to the RSIP host 28, the RSIP host 28 saves the block of locally unique ports 42 that it may use. The one or more locally unique ports 42 are allocated to protocols and applications in layered protocol stack 46 on the RSIP host 28 to replace local or default ports. If no addresses are available, the RSIP gateway 38 returns an error message to the RSIP host 28. The locally unique ports 42 are saved in a data structure with a flag-field indicating whether the locally unique port 42 is allocated or unused. Table 1 is pseudo-code for an exemplary data structures to store locally unique port 42 information However, other data structures or layouts could also be used.

TABLE 1 struct locally_unique_ports
{
    int port_number;
    flag status:1; /*one bit flag, 0 = unused, 1 = allocated */
} gu_ports[MAX_GU];
int number_of_gu_ports; /*number of locally unique ports allocated */

The one or more locally unique ports 42 are allocated to protocols and applications in layered protocol stack 46 on the first network subdevice 6. Upon receiving an unsuccessful assign response message 78, the network subdevice may send another assign request message 76 for fewer ports. If the router 20 cannot allocate a large enough block of contiguous locally unique ports 42 for the first network subdevice 6, it may send an assign response message 68 with a success code, but allocate fewer locally unique ports 42 than requested.

In an illustrative embodiment of the present invention, the router subsystem 20 allocates blocks of locally unique ports 42 to communications card 24. However, other second network devices 7 could also be used to allocate locally unique ports 42 (e.g., a port server).

Figure 14:
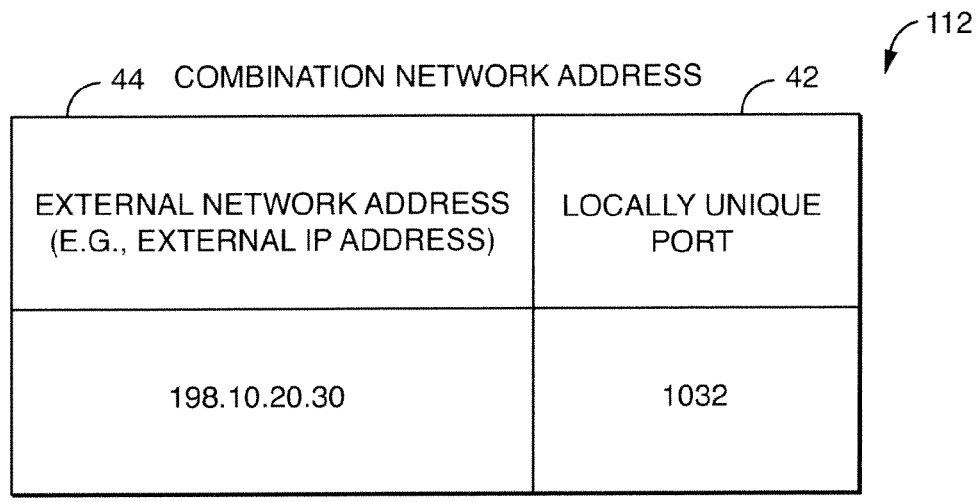
FIG. 14 is a block diagram illustrating a combination network address.

FIG. 14 is a block diagram illustrating a layout for a combination network address 112. Combination network address layout 112 preferably includes a common external network address 44, such as an IP 58 address, and a locally unique port 42 obtained by sending an assign request message 76 and receiving an assign response message 78 from a second network subdevice 7. However, other layouts could also be used. The first network subdevices 6 use combination network address 112 for communications with external second network 14. Common external network address 44 identifies the first private computer network 10 to an external second computer network 14.

As is known in the art, to identify separate data streams, TCP 66 provides a source port field 114 and a source address field 116 in a TCP header 113. Since local or default port identifiers are selected independently by each TCP 66 stack in a network, they are typically not unique. To provide for unique addresses within each TCP 66, a local Internet address identifying TCP 66 can be concatenated with a local port identifier and a remote Internet address and a remote port identifier to create a "socket" that will be unique throughout all networks connected together. Sockets are known to those skilled in the networking arts.

In an illustrative embodiment of the present invention, the source port in a TCP header 113 is given a locally unique port 42 obtained with RSIP 64 and given a common external network address 44. Together they uniquely identify applications and protocols on the first network subdevices 6 on first private computer network 10 to the second external computer network (e.g., 14 or 15) with a value conceptually similar to the socket used by TCP 66.

As is also known in the art, UDP 68 also has a source port field 118 in a UDP header 117. The UDP source port field 118 is an optional field; when used, it indicates a port of the sending process, and may be assumed to be the port to which a reply should be addressed in the absence of any other information. If not used, a value of zero is inserted. A UDP header 117 also has a source address field 120. A locally unique port can also be used in a UDP header 117.

In an illustrative embodiment of the present invention, RSIP 70 is used to create combination network address 44 that is used in TCP header 113 and UDP header 117 fields. In another embodiment of the present invention, the combination network address 44 is stored in other message header fields understood by the router 20 (i.e., non-IP 58, TCP 66, or UDP 68 fields) and the second computer network 14.

The router 20 maintains a port-to-internal network address table 122 as locally unique ports 42 are allocated. The router 20 also has an internal table 124 indicating internal network addresses for all network subdevices 5 on the first private computer network 10. In an illustrative embodiment of the present invention, the internal network addresses for the first private computer network 10 are IP 58 addresses; however, other internal network addresses could also be used, such as a Medium Access Control ("MAC") protocol address. As an example, communications card 24 may have an internal IP address of 10.0.0.1, while the router 20 has an internal IP address of 10.0.0.2. The internal addresses are not published on the external computer network 14.

Figure 15:
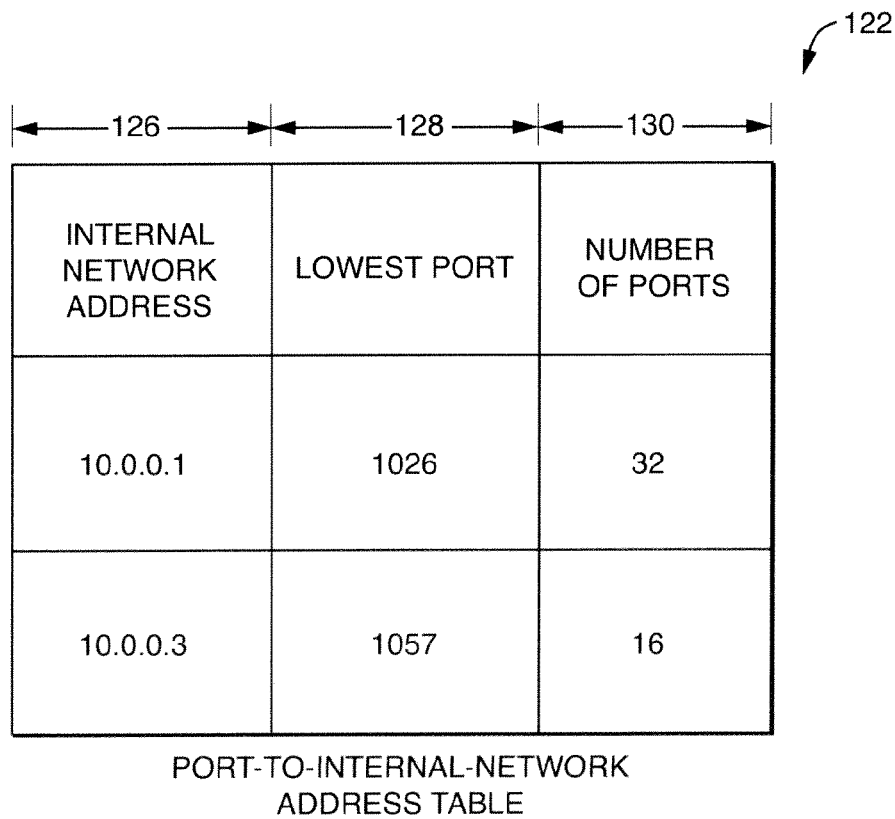
FIG. 15 is a block diagram illustrating a port-to-internal address table.

FIG. 15 is a block diagram illustrating a port-to-internal address table 122 layout maintained by the router 20. However, other layouts and more or fewer rows and columns could alternatively be used. Port-to-internal address table 122 layout has three columns: an internal-network-address column 126, a lowest-port column 128, and a number-of-ports column 130. However, more or fewer columns or other table layouts could also be used. The first row of the table 132 indicates that a first network subdevice 6 (e.g., a communications card 24) has been allocated ports 1-32 for use with internal network address 10.0.0.1. A second network subdevice 7 (e.g., a the router 20) uses ports 100-116 with internal network address 10.0.0.2. An internal network address may have several entries in port-to-internal address table 122.

Realm Specific Internet Protocol

Figure 16:
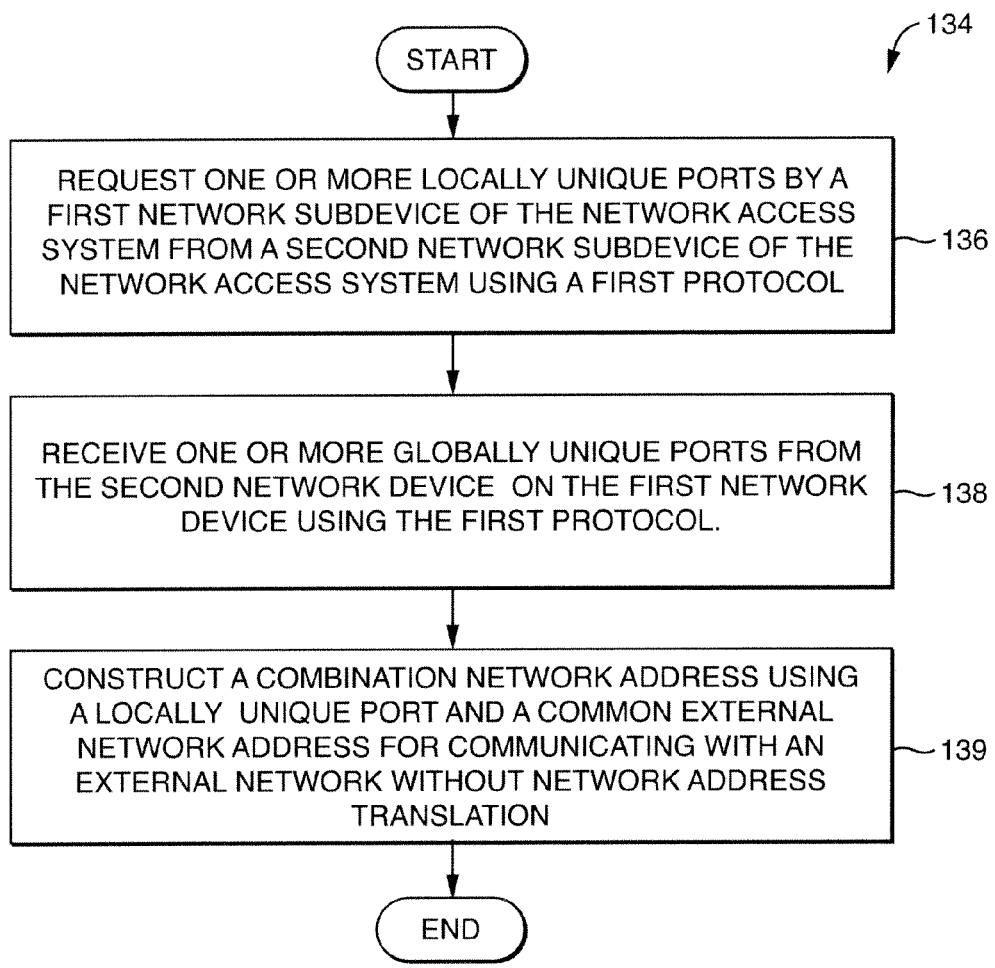
FIG. 16 is a flow diagram illustrating a method for creating a combination network address.

FIG. 16 is a flow diagram illustrating a method 134 for implementing RSIP in NAS 2. At step 136, a first network subdevice 6 on NAS 2 requests a common external address 44 and one or more locally unique ports 42 from a second network subdevice 7 on the NAS 2 with a first protocol 13. The locally unique ports 42 are used in protocol layers in the layered protocol stack 42 on the first network subdevice 6. In addition, the locally unique ports 42 are used to create a combination network address 112 comprising a locally unique port 42 and a common external address 44 to communicate with a second external computer network 14 without address translation. At step 138, the first network subdevice 6 receives the common external address 44 and one or more locally unique ports 42 from the second network subdevice 7. At step 140, the first network subdevice 6 constructs one or more combination network addresses 112 using the one or more locally unique ports 42 and a common external network address 44 used to identify the NAS 2 to the second external computer network 14.

In an illustrative embodiment of the present invention, the first network subdevice 6 is communications card 24, the second network subdevice 7 is the router 20, the first protocol 13 is RSIP 70, the second external computer network 14 is the Internet or a private network. The combination network address includes a common IP 58 address (e.g., common network address 44) identifying network subdevices 6 and 7 on NAS 2 to a second external computer network 14. However, the present invention is not limited to the networks, network devices, network addresses or protocols described and others may also be used.

The ports 42 are used for entities such as protocols and applications in layered protocol stack 42 on network device and are locally unique on NAS 2. The locally unique ports 42 will identify a network subdevice on NAS 2. After allocation with method 130, a network subdevice uses a locally unique port 42 in a protocol layer in layered protocol stack 42. As is illustrated in FIG. 15, first network subdevice 6 with internal IP 58 address 10.0.0.1 is assigned thirty-two locally unique ports in the range of 1-32. The first network subdevice 6 may assign locally unique port-2 to TCP 66 to use as a source port. The combination network address 112 illustrated in FIG. 14 is then assigned to TCP 66 on the first network subdevice 6 for communications with an external network (e.g., 14 or 15). Other locally unique ports 42 are assigned to other protocols and applications in layered protocol stack 42 on a network subdevice 6.

In one embodiment of the present invention, locally unique ports are assigned to protocol layers in layered protocol stack 42 when a network device boots. In another embodiment of the present invention, locally unique ports are assigned to protocol layers in layered protocol stack when a protocol layer makes a request for an external network (e.g., 14 or 15). In yet another embodiment of the present invention, locally unique ports are assigned dynamically or on-the-fly in an individual protocol layer as a protocol layer makes a request for an external network (e.g., 14 or 15).

The locally unique ports 42 with common external network address 44, together forming combination network address 112, uniquely identify a network subdevice 6 to an external network 14 without translation.

Figure 17:
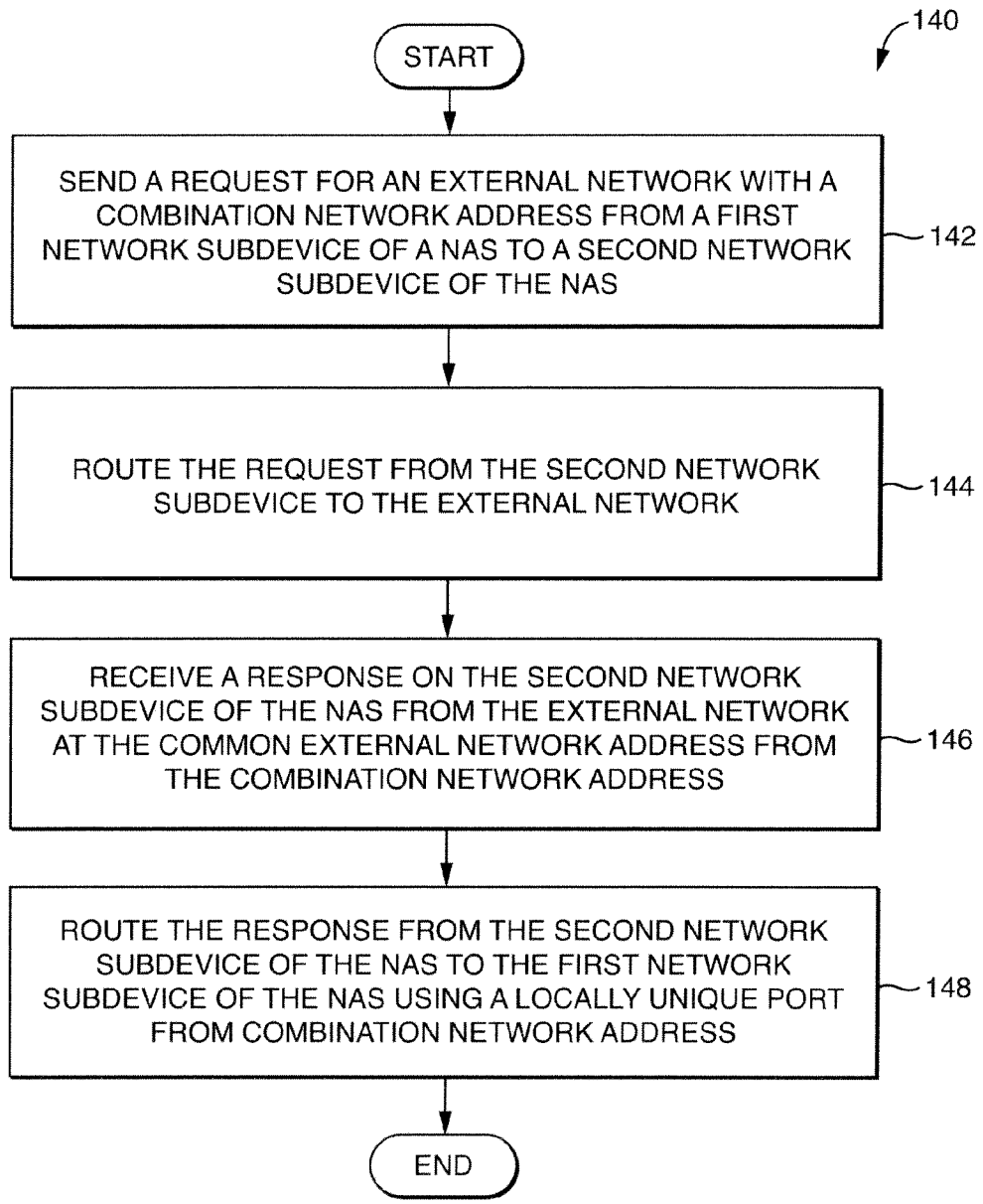
FIG. 17 is a flow diagram illustrating a method for implementing RSIP in the network access server.

FIG. 17 is a flow diagram illustrating a method 140 for implementing RSIP. At step 142, a communication is sent from a first network subdevice 6 on a NAS 2 to a second network subdevice 7 on the NAS 2. The communication is for a second external network 14 and includes a combination network address 112 identifying the first network subdevice 6 on the NAS 2. The combination network address 112 is constructed with method 130 (FIG. 16) and includes a locally unique port 42 and a common external address 44 to identify the NAS 2 to the second external network 14. At step 144, the second network subdevice 7 routes the request from the NAS 2 to the second external network 14. At step 146, the second network subdevice 7 on the NAS 2 receives a response communication from the external second computer network 14 at the external network address 44 identifying the NAS 2 from the combination network address 112. At step 148, the second network subdevice 7 on the NAS 2 routes the response communication to the first network subdevice 6 on the NAS 2 using the locally unique port 42 from the combination network address 112.

In an illustrative embodiment of the present invention, the first network subdevice 6 is a communications card 24, the second network subdevice is a the router 20, the NAS 2 is a stub network, and the second computer network is the Internet or a private network. The combination network address 112 includes a locally unique port 42 obtained with RSIP 70 and an external IP 58 address 44 for an external network 14 such as the Internet, an intranet, or another computer network.

However, the present invention is not limited to the networks, network devices, network address or protocol described and others may also be used.

The method 140 (FIG. 17) is illustrated with a specific example using TCP 66/IP 58 layers from layered protocol stack 42. However, other protocol layers in layered protocol stack 42 could also be used. At step 142, the first network subdevice 6 sends a TCP 66 communication to the router 20, for example, a TCP 66 communication for the router 20 at external IP 58 address 192.200.20.3 on second computer network 30. Table 2 illustrates an example of a communication data packet sent at step 142.

TABLE 2

| IP 58 Header | TCP 66 Header |
|---|---|
| SRC IP: 198.10.20.30 | SRC Port: 2 |
| DST IP: 192.200.20.3 | DST Port: 80 |

The source IP 58 address is common external network address 44 (e.g., 198.10.20.30) and the source port is locally unique port 2 obtained via RSIP 70 with the method 130 and assigned to TCP 66. In one embodiment of the present invention, the locally unique port 2 for TCP 66 is requested and assigned when the first network subdevice 6 is booted. In another embodiment of the present invention, the locally unique port 2 is assigned when a protocol layer in the layered protocol stack initiates the communication with the external network 14. The locally unique port along with the common external address 44 comprise the combination network address 112. The destination IP address is 192.200.20.3 for the router 20 (FIG. 2) on the second external network 30 and the destination port is well known Internet port 80. When the communication reaches the link layer 48, in the layered protocol stack 42, an outer IP 58 header is added to route the communication to the router 20. The local internal network address (e.g., 10.0.0.x) for a network subdevice for internal communications is maintained in the link layer 48. Table 3 illustrates an exemplary data packet with an outer IP 58 header added for the router 20.

TABLE 3

| Outer IP 58 header | Inner IP 58 header | TCP 66 header |
|---|---|---|
| SRC IP: 10.0.0.1 | SRC IP: 198.10.20.30 | SRC Port: 2 |
| DST IP: 10.0.0.7 | DST IP: 192.200.20.3 | SRC Port: 80 |

The link layer 48 adds the outer IP 58 header including a source IP 58 address for the first network subdevice 6 of 10.0.0.1 and a destination IP 58 address of 10.0.0.7 for the router 20. At step 144, the router 20 receives the communication data packet, strips the outer IP 58 header, and sends the communication data packet to the external network 14.

At step 146, the router 20 receives a response communication packet from an external network (e.g., 30). An example of a response data packet is illustrated in Table 4.

TABLE 4

| IP 58 Header | TCP 66 Header |
|---|---|
| SRC IP: 192.200.20.3 | SRC Port: 80 |
| DST IP: 198.10.20.30 | DST Port: 2 |

The router 20 receives the response packet from the external second network 14 at step 146 with the destination IP 58 address, common external network address 198.10.20.30 and the destination port set to locally unique port 2. The router 20 uses port-to-internal network address table (FIG. 15) to map destination port 2 to the internal IP 58 address 10.0.0.1 for first network device 6. The router 20 adds an outer IP 58 header to route the response data packet back to the first network subdevice 6. Table 5 illustrates an exemplary response packet with outer IP 58 header added by the router 20.

TABLE 5

| Outer IP 58 header | Inner IP 58 header | TCP 66 header |
|---|---|---|
| SRC IP: 10.0.0.7 | SRC IP: 192.200.20.3 | SRC Port: 80 |
| DST IP: 10.0.0.1 | DST IP: 198.10.20.30 | SRC Port: 2 |

The outer IP 58 header has a source internal IP 58 address of 10.0.0.7 for the router 20 and a destination internal IP 58 address of 10.0.0.1 for the first network subdevice 6 on the computer network 10. At step 148, the router 20 routes the response data packet to the first network subdevice 6 with the outer IP 58 header. The link layer 48 in the layered protocol stack 42 strips the outer IP 58 header and forwards the response data packet to the network layer 50.

The first network subdevice 6 sends a communication to an external network 14 and receives a response communication from the external network 14 using RSIP 70 and the locally unique port 42 allocated with RSIP 70. The router 20 does not translate any source/destination IP 58 addresses or source/destination ports. Thus, RSIP is accomplished without network address translation at the router 20.

An illustrative embodiment of the present invention is described with respect to a single common external network address 44 identifying multiple network subdevices 6 and 7 on NAS 2 and used in the combination network address 112 with a locally unique port 42. However, the present invention is not limited to a single common external network address and can also be practiced with a multiple common external network addresses.

RSIP using method 134 (FIG. 16) and method 140 (FIG. 17) removes the computational burden of NAT at the router 20 and allows multiple network subdevices 6 to use a single or a small number of external network addresses 44 known to an external network 14 such as the Internet or an intranet. Instead of providing NAT, the router 20 routes data packets from a first network subdevice 6 on NAS 2 to a second external computer network 14 using the combination network address 112. In addition, the router 20 is no longer required to support multiple application protocols from the layered protocol stack 42.

The router 20 also routes data packets from the second external computer network 14 back to a first network subdevice 6 on the NAS 2 using the locally unique port 42 in the combination network address 112. The router 20 is no longer required to replace an internal network address 10 with an external network address 44 for outbound traffic, nor to replace an external network address 44 with an internal network address 11 for inbound traffic. Thus, RSIP of the present invention removes the computational burden of NAT from the router 20 and does not violate the Internet principal of providing end-to-end transmission of data packets between network devices without alterations. This allows end to end protocols, such as IPsec, to work between the NAS 2 and the external network 14.

An embodiment of the architecture of the present invention is an IP telephony system. In this case, NAS 2 is an IP Telephony Gateway system, with the communications cards 24 acting as media translators between the public-switched telephone network ("PSTN"; not shown in FIG. 2) and the internal IP network 10. Data application 32 provides media translation (gateway) functionality, while a device control application 30 allows each media device (per card) to be controlled remotely. More specifically, each communications card 24 appears as a MEGACO-compliant (See Cuervo et al., "*Megaco Protocol*," Internet Draft <draft-ietf-megaco-protocol-06.txt, Feb. 8, 2000, incorporated herein by reference) Media Gateway ("MG"), and the IP device control element 31 on the external IP signaling network 29 is a MEGACO-compliant Media Gateway Controller ("MGC"). The signaling/control communications between the MGC and MG in MEGACO is indicated in FIG. 2 by the dashed line between device control application 30 on communications card 24, and the IP control device 31 on the external signaling network 29.

Similarly, data application 32 on each card 24 provides the media capability of the MG. The specific applications for this example includes real-time transport protocol ("RTP") for transport of the media on the IP network. For more information on RTP, see H. Schulzrinne, et al., RTP: *A Transport Protocol for Real-Time Applications*, RFC-1889, incorporated herein by reference. This application communicates with a peer application on an external media device 33. The media communications between the MG and its IP peer are indicated in FIG. 2 by the dashed line between data application 32 on communications card 24, and IP media device 33 on external IP data network 27.

In the case of both MEGAGO and RTP external communications with the internal MG use IP. Therefore the internal MG must be IP-addressable. As shown in the example configuration, each communications card 24 has an IP interface 26 to support IP communications with other IP devices, such as the MGC or external media device. However, the IP interface 26 on each card 24 provides only an internal (private) IP address. The external (public) IP interfaces are provided by router subsystem 20. Therefore, the collection of communications cards 24 (distributed among multiple chassis 18 in this example) comprises a stub network. By implementing an RSIP gateway 38 on router subsystem 20, and an RSIP host 28 on each of the communications cards 24, external IP devices, such as MGC or external MG (peer media device), can communicate directly with the internal, card-based MG over one or more external IP networks connected at the router subsystem 20.

There are a number of alternative configurations for the implementation of RSIP in a NAS such as the one illustrated in FIG. 2. If the router subsystem 20 provides multiple external IP interfaces 12, then a single RSIP gateway 38 must be able to distinguish among them in order to properly route packets across them. Alternatively, a separate RSIP gateway 38 may be implemented on each external IP interface 12. In another preferred embodiment, the functionality of the RSIP gateway 38 is decomposed in such a way as to provide a single, common management component, and separate mapping components (one for each external IP interface 12). Similarly, each communications card 24 may implement one or multiple RSIP hosts 28, where the choice may depend upon the number of IP interfaces 12 on each card 24. Finally, the RSIP gateway 38 may reside on a subsystem other than the router subsystem 20. The only requirement is that RSIP gateway 38 resides between the internal and external IP interface (s).

Address mapping/sharing may also be required in cases where two different address spaces must be bridged. The embodiments presented herein assume that the address spaces are an internal, private IP network and external, public IP networks. The method of using RSIP 70 in a NAS 2, however, applies equally well for bridging networks using different versions of IP 58. For example, the invention could bridge an internal IPv4 network and an external IPv6 network, an internal (private) IPv4 network and an external (public) IPv6 network, an internal (private) IPv6 network and an external (public) IPv4 network, or an internal (private) IPv6 network and an external (public) IPv6 network.

The various embodiments of the present invention described above offer several advantages over the prior art. Network address translation and the large computational burden is removed from a router and distributed to individual network devices using a port allocation protocol to allocate locally unique ports and globally unique addresses. RSIP with port translation does not violate the Internet principal that recommends that packets flow end-to-end between network devices without changing the contents of any packet along a transmission route. Illustrative embodiments of the present invention can support multi-casting with a router serving as a proxy for internal network devices that wish to join an existing multicast session. Illustrative embodiments of the present invention can also be used to support Virtual Private Networks ("VPNs").

RSIP also allows a local network to efficiently switch between external network service providers (e.g., Internet service providers) by changing the common external address for an external network assigned to a local network. RSIP also allows a local network to purchase a smaller block of external network addresses, providing a cost savings on the local network.

The various embodiments of the present invention described above offer several advantages over the prior art. Network address translation and the large computational burden is removed from a router and distributed to individual network devices using a port allocation protocol to allocate locally unique ports. RSIP does not violate the Internet principal that recommends that packets flow end-to-end between network devices without changing the contents of any packet along a transmission route, which breaks some protocols. Moreover, for a system such as the one illustrated in FIG. 2, the ability to terminate an IPsec connection (security association) at the device control application and/or data application on any communications card might be a requirement. RSIP introduces no hindrance to such a required capability, and was, in fact, developed specifically to allow for it. If NAT were used instead to provide the address mapping/sharing functionality for such a system, IPsec connections to the individual IP-addressable sub-components of the system would be impossible. RSIP is the only method for providing the simultaneous capabilities of address mapping/sharing and end-to-end IPsec. This applies equally for any application or protocol that requires end-to-end connectivity (i.e., strict disallowance of packet modification by intermediate routers, forwarders, etc.). The methods of the present invention are useful with IPsec as previously described in U.S. application Ser. No. 09/270,967, filed Mar. 17, 1999, incorporated herein by reference.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method of implementing Realm Specific Internet Protocol in a network access system, the method comprising the steps of:
   (a) providing a network access system comprising a plurality of network subdevices in a chassis and connected by an internal network, the plurality including a first network subdevice and a second network subdevice, the second network subdevice having an interface on an external network;
   (b) requesting, via the internal network, by the first network subdevice using a first protocol, a common external network address and one or more ports from the second network subdevice to identify the first network subdevice during communications with the external network;
   (c) receiving, via the internal network, the common external network address and an identifier of the one or more ports at the first network subdevice from the second network subdevice;
   (d) updating entries in an address-to-address table maintained by the second network subdevice to reflect assignment of the common external network address and one or more ports to the first network subdevice; and
   (e) creating a combination network address for the first network subdevice with the identifier of the one or more ports and the common external network address, the combination network address identifying the first network subdevice for communications with the external network by way of the interface on the external network.

2. A computer readable medium having stored therein instructions for causing a central processing unit to execute the method of claim 1.

3. The method of claim 1 further comprising:
   (f) sending a request from the first network subdevice to the second network subdevice via the internal network;
   (g) routing the request from the second network subdevice to the external network by way of the interface on the external network;
   (h) receiving a reply at the second network subdevice on the common external network address for the network access system; and
   (i) routing the reply from the second network subdevice to the first network subdevice via the internal network using the locally unique port from the combination network address.

4. The method of claim 1 wherein the first protocol is a Realm Specific Internet Protocol comprising a Realm Specific Internet Protocol assign request message, a Realm Specific Internet Protocol assign response message, and the combination network address involving a locally unique port and a common external network address.

5. The method of claim 1 wherein the common external network address is an Internet protocol address.

6. The method of claim 1 wherein the first network subdevice is a communications card.

7. The method of claim 6 wherein the communications card comprises a Realm Specific Internet Protocol host and an Internet protocol interface.

8. The method of claim 7 wherein the communications card further comprises a data application and a device control application.

9. The method of claim 1 wherein the second network subdevice is a router or a port server.

10. The method of claim 1 wherein the second network subdevice comprises a Realm Specific Internet Protocol gateway and a plurality of Internet protocol interfaces.

11. The method of claim 1 wherein the external network is any of the Internet, an intranet or a public-switched telephone network.

12. The method of claim 11 wherein the common external network address is an Internet protocol address.

13. The method of claim 1 wherein the plurality of subdevices of the network access system comprise a local area network and the external network is any of the Internet or an intranet.

14. A network access device, comprising in combination within a chassis:
   (a) an internal network;
   (b) a first network subdevice comprising a network client on the internal network; and,
   (c) a second network subdevice on the internal network comprising a network address server for allocating an external network address and one or more ports to the first network subdevice, wherein the second network subdevice has an internal network address for communicating with other network subdevices on the internal network and an external network address for communicating with a plurality of network devices on an external network, and wherein the network address server is used to allocate the external network address to the first network subdevice on the internal network,
   wherein the first network subdevice has a first internal network address for communicating with other network subdevices on the internal network and requests from the second network subdevice allocation of the external network address and one or more ports for communicating with a plurality of network devices on the external network; and
   wherein the first network subdevice further comprises an IP interface and the client of the first network subdevice is a Realm Specific Internet Protocol host.

15. A network access device, comprising in combination within a chassis:
   (a) an internal network;
   (b) a first network subdevice comprising a network client on the internal network; and,
   (c) a second network subdevice on the internal network comprising a network address server for allocating an external network address and one or more ports to the first network subdevice, wherein the second network subdevice has an internal network address for communicating with other network subdevices on the internal network and an external network address for communicating with a plurality of network devices on an external network, and wherein the network address server is used to allocate the external network address to the first network subdevice on the internal network,
   wherein the first network subdevice has a first internal network address for communicating with other network subdevices on the internal network and requests from the second network subdevice allocation of the external network address and one or more ports for communicating with a plurality of network devices on the external network; and wherein the second network subdevice further comprises an IP interface and the network address server of the second network subdevice is a Realm Specific Internet Protocol gateway.

16. A network access device, comprising in combination within a chassis:
   (a) an internal network;
   (b) a first network subdevice comprising a network client on the internal network; and,
   (c) a second network subdevice on the internal network comprising a network address server for allocating an external network address and one or more ports to the first network subdevice, wherein the second network subdevice has an internal network address for communicating with other network subdevices on the internal network and an external network address for communicating with a plurality of network devices on an external network, and wherein the network address server is used to allocate the external network address to the first network subdevice on the internal network, wherein the first network subdevice has a first internal network address for communicating with other network subdevices on the internal network and requests from the second network subdevice allocation of the external network address and one or more ports for communicating with a plurality of network devices on the external network; and wherein the first network subdevice further comprises a data application and a device control application.

17. The network access device of claim 16 wherein the network access device is an Internet telephony gateway system.

18. The network access device of claim 16 wherein the network access device is an Internet telephony gateway system and wherein the data application provides media translation functionality and the device control application provides for remote control of the first network subdevice by a network device on the second external network.

19. The network access device of claim 16 wherein the network access device is an Internet telephony gateway system and wherein the first network subdevice is a MEGACO-compliant media gateway.

20. The network access device of claim 16 wherein the network access device is an Internet telephony gateway system and wherein the external network comprises an external Internet Protocol signaling network having an Internet Protocol control device and an external Internet Protocol data network having an Internet Protocol media device.

21. The network access device of claim 16 wherein the external network comprises an external Internet Protocol signaling network having an Internet Protocol control device and an external Internet Protocol data network having an Internet Protocol media device and wherein the Internet Protocol control device on the external Internet Protocol signaling network is a MEGACO-compliant media gateway controller.

* * * * *